United States Patent
Liu et al.

(10) Patent No.: US 9,122,727 B1
(45) Date of Patent: Sep. 1, 2015

(54) IDENTIFICATION OF RELATED SEARCH QUERIES THAT REPRESENT DIFFERENT INFORMATION REQUESTS

(71) Applicant: Google Inc., Mountain View, CA (US)

(72) Inventors: Sean Liu, El Dorado Hills, CA (US); Emily Moxley, San Francisco, CA (US)

(73) Assignee: Google Inc., Mountain View, CA (US)

( * ) Notice: Subject to any disclaimer, the term of this patent is extended or adjusted under 35 U.S.C. 154(b) by 285 days.

(21) Appl. No.: 13/782,761

(22) Filed: Mar. 1, 2013

Related U.S. Application Data

(60) Provisional application No. 61/605,951, filed on Mar. 2, 2012.

(51) Int. Cl.
   *G06F 17/30* (2006.01)

(52) U.S. Cl.
   CPC .... *G06F 17/30516* (2013.01); *G06F 17/30554* (2013.01); *G06F 17/30864* (2013.01)

(58) Field of Classification Search
   CPC ............... G06F 17/30516; G06F 17/30864
   USPC ............... 707/713, 723, 765, 767, 708, 737
   See application file for complete search history.

(56) References Cited

U.S. PATENT DOCUMENTS

| | | | |
|---|---|---|---|
| 7,769,735 B2 * | 8/2010 | Wasserman et al. | 707/705 |
| 8,713,001 B2 * | 4/2014 | Roy et al. | 707/722 |
| 2010/0161643 A1 * | 6/2010 | Gionis et al. | 707/765 |

* cited by examiner

*Primary Examiner* — Marc Filipczyk
(74) *Attorney, Agent, or Firm* — Middleton Reutlinger

(57) ABSTRACT

Methods, systems and apparatus are described herein that include obtaining a respective ordered list of search result documents for each query in a plurality of queries. Non-overlap scores between search result documents within a first grouping in the ordered lists for a given query and remaining queries in the plurality of queries are then calculated. One or more remaining queries are then selected as candidate queries using the non-overlap scores. Overlap scores between search result documents within a second grouping in the ordered lists for the given query and the candidate queries are then calculated. One or more of the candidate queries are selected as related queries for the given query using the overlap scores. The related queries are then associated with the given query.

35 Claims, 4 Drawing Sheets

IDENTIFICATION OF RELATED SEARCH QUERIES THAT REPRESENT DIFFERENT INFORMATION REQUESTS

CROSS REFERENCE TO RELATED APPLICATIONS

This application claims the benefit of U.S. Provisional Application No. 61/605,951 filed on Mar. 2, 2012, entitled "Identification of related search queries that represent different information requests," the disclosure of which is incorporated by reference herein in its entirety.

BACKGROUND

The present disclosure relates to information retrieval.

Information retrieval systems, such as Internet search engines, help users by retrieving information, such as web pages, images, text documents and multimedia content, in response to search queries. A search engine locates and stores the location of documents in a searchable index used to facilitate fast information retrieval. The search engine may use a variety of statistical measures to determine the relevance of the documents in the index to the user's query to identify and provide search results.

Formulating a search query that accurately represents the user's information need can be challenging. As a result, the search engine may identify a number of resources which match terms in the user's query, but which are unrelated to the actual information need of the user. The user may thus have to enter a number of different queries during the same search session. Although these queries are different, the search results returned from the search engine may be quite similar because these queries relate to the same information need of the user. In such a case, the same highly ranked search results may be provided to the user multiple times during the search session.

SUMMARY

In some implementations, a method is described that includes identifying a respective ordered list of search result documents for each query in a plurality of queries. The method further includes identifying a given query in the plurality of queries; a first and second grouping in the ordered list for the given query; and a first and second grouping in the ordered list for each of the remaining queries in the plurality of queries. The method also includes determining non-overlap scores between the given query and each of the remaining queries in the plurality of queries. The non-overlap scores measure the dissimilarities between the search result documents within the first grouping in the ordered list for the given query appear and the first grouping in the ordered list for each of the remaining queries in the plurality of queries. The method also includes selecting one or more candidate queries from the remaining queries in the plurality of queries based on the non-overlap scores. The method also includes determining overlap scores between the given query and each of the candidate queries. The overlap scores measure the similarities between the search result documents within the second grouping in the ordered list for the given query and the second grouping in the ordered list for each of the candidate queries. The method also includes selecting one or more related queries from the candidate queries based on the overlap scores. The method also includes associating the related queries with the given query.

This method and other implementations of the technology disclosed can each optionally include one or more of the following features.

The non-overlap scores may be determined based on a comparison of the search result documents within the first grouping in the ordered list for the given query and the search result documents within a first grouping in the ordered lists for each of the remaining queries in the plurality of queries. In some implementations, the non-overlap scores may be determined based on similarity scores between the search result documents within the first grouping in the ordered list for the given query and the search result documents within the first grouping in the ordered lists for each of the remaining queries in the plurality of queries. In yet other implementations, the non-overlap scores may be determined based on both the comparison of the search result documents within the respective first groupings and on similarity scores between the search result documents within the respective first groupings.

The overlap scores may be determined based on a comparison of the search result documents within the second grouping in the ordered list for the given query and the search result documents within a second grouping in the ordered lists for each of the candidate queries. In some implementations, the overlap scores may be determined based on similarity scores between the search result documents within the second grouping in the ordered list for the given query and the search result documents within the second grouping in the ordered lists for each of the candidate queries.

The search results documents in the first grouping in the ordered list for the given query may have the same ordering as the respective search result documents in the first grouping in the ordered list for each of the remaining queries in the plurality of queries.

The search results documents in the second grouping in the ordered list for the given query may have the same ordering as the respective search result documents in the second grouping in the ordered list for each of the candidate queries.

At least one search result document within the respective first groupings in the respective ordered lists may have a higher numerical order than at least one search result document within the respective second groupings in the respective ordered lists.

Each search result document within the respective first groupings in the respective ordered lists may have a higher numerical order than each search result document within the respective second groupings in the respective ordered lists.

The ordered lists of search result documents may be obtained from a search engine. The search results corresponding to each of the search result documents within the first grouping in the respective ordered lists may appear on a first search results page received from the search engine in response to the corresponding queries. In some implementations, none of the search results corresponding to the search result documents within the second range in the respective ordered lists may appear on the first search results page received from the search engine in response to the corresponding queries.

The first grouping may comprise a predetermined number of highest ranked search result documents in the respective ordered lists.

The queries in the plurality of queries may be past queries submitted by prior users. Selecting one or more of the candidate queries may be further based on a frequency that the respective candidate queries were submitted by the prior users. Selecting one or more of the candidate queries may be further based on elapsed times since the respective candidate queries were submitted by the prior users.

The method may further include receiving the given query. One or more of the related queries may then be transmitted as query suggestions for the received given query.

Transmitting the selected one or more related queries may include transmitting a search results page. The search results page may include the one or more related queries and identify search results documents in the ordered list for the given query. The search results page may further identify search results documents in the ordered list for the one or more related queries.

Selecting one or more candidate queries from the remaining queries in the plurality of queries may include selecting a predetermined number of remaining queries having the highest non-overlap scores.

Selecting one or more related queries from the candidate queries can include selecting a predetermined number of candidate queries having the highest overlap scores.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein may identify search queries that represent related topics or concepts, but which do not represent substantially the same information request. In response to a user's query, one or more of its related queries may then be provided as a query suggestion to the user. These related queries represent information requests that may be relevant to the information need of the user, while also producing search results different from the information already being searched by the user. As a result, the subsequent submission of a related query by the user may reduce or eliminate the repeated, prominent presentation of the same search results during a search session. In doing so, meaningful query suggestions can be provided which increase the likelihood of assisting users in obtaining search results containing the information they actually seek.

Particular aspects of one or more implementations of the subject matter described in this specification are set forth in the drawings and the description below. Other features, aspects, and advantages of the subject matter will become apparent from the description, the drawings, and the claims.

DETAILED DESCRIPTION

Technology described herein identifies search queries that represent related topics or concepts, but which do not represent substantially the same information request. The technology includes associating queries as related if their higher ranked search results are quite different, and their lower ranked search results include a number of documents in common. An appreciable overlap among their lower ranked search results in comparison to their higher ranked search results indicates a likelihood that the two queries represent related information requests, but that these two queries do not represent the same or similar information request.

In response to a user's query, one or more of its related queries can then be provided as query suggestions to the user. These related queries represent information requests that may be relevant to the information need of the user, while also producing search results different from the information already being searched by the user. As a result, the subsequent submission of a related query by the user can reduce or eliminate the repeated, prominent presentation of the same search results during a search session. In doing so, meaningful query suggestions can be provided which increase the likelihood of assisting users in obtaining search results containing the information they actually seek.

Figure 1:
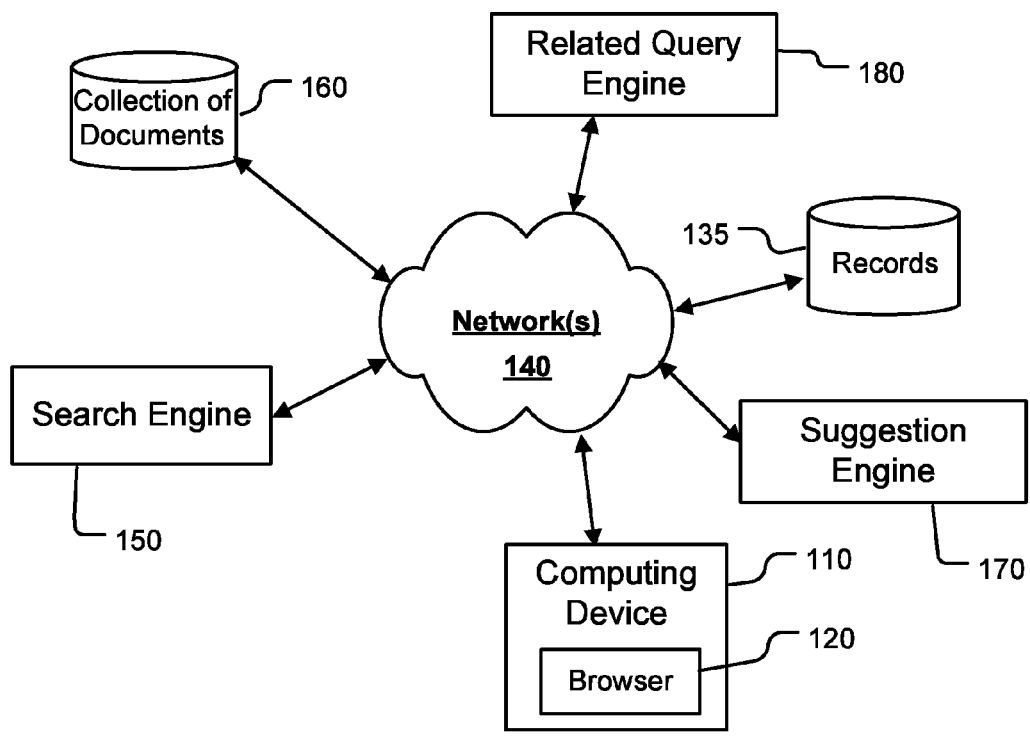
FIG. 1 illustrates a block diagram of an example environment in which identifying related queries that represent different information requests can be used.

FIG. 1 illustrates a block diagram of an example environment in which identifying related queries that represent different information requests can be used. The environment 100 includes a client computing device 110 and a search engine 150. The environment 100 also includes a communication network (or networks) 140 that allows for communication between various components of the environment 100.

In some implementations, the network 140 includes the Internet. The network 140 can also utilize dedicated or private communication links that are not necessarily part of the Internet. In some implementations, the network 140 uses standard communications technologies, protocols, and/or inter-process communication technologies.

During operation, a user interacts with the search engine 150 through the use of the client computing device 110. The client computing device 110 and the search engine 150 each include memory for storage of data and software applications, a processor for accessing data and executing applications, and components that facilitate communication over the network 140.

The client computing device 110 executes an application, such as a web browser 120, which provides a search field that allows the user to formulate search queries and submit them to the search engine 150. The client computing device 110 may be for example a desktop computer, a laptop, a tablet computer, a mobile phone, or any other type of computing device.

The search engine 150 receives a search query submitted from the client computing device 110, and executes the search query against a collection of documents 160 such as web pages, images, text documents, and multimedia content to produce search results. The search results identify an ordered list of search result documents in the collection of documents 160 that are relevant to the user's query. The search engine 150 can use conventional or other techniques to determine which documents in the collection of documents 160 to include in the ordered list, and the ranking of each of the documents within the list.

The collection of documents 160 may be collectively stored on multiple computers and/or storage devices. A document in the collection of documents 160 may be a web page, a word processing document, a portable document format (PDF) document, or any other type of electronic document. In some implementations, the collection of documents 160 is obtained from the World Wide Web.

The search engine 150 maintains records 135 of past queries submitted by prior users. The records 135 may be collectively stored on one or more computers and/or storage devices. The search engine 150 may maintain an aggregated or anonymized record of queries.

The past queries in the records 135 are analyzed by a related query engine 180 using the techniques described herein to identify and associate queries that are related, but which represent different information requests. As described in more detail below, the related query engine 180 determines that two queries are related based at least in part on if their higher ranked search results are quite different, and their lower ranked search results include a number of documents in common. The appreciable overlap among their lower ranked search results in comparison to their higher ranked search results indicates that two queries may represent related information requests, but that these two queries do not represent the same or similar information request.

The related query engine 180 can be implemented in hardware, firmware, or software running on hardware. The related query engine 180 is described in more detail below with respect to FIGS. 2-4.

The search engine 150 provides the user's query to the related query engine 180. In response, the related query engine 180 transmits one or more related queries for the user's query to the search engine 150. These related queries represent information requests that may be relevant to the information need of the user, while also being different from the information already being searched by the user. Since the related queries have different highly ranked search results, the subsequent submission of a related query by the user can reduce or eliminate the repeated, prominent presentation of the same search results during the user's search session. This in turn increases the likelihood of providing search results containing the information the user actually seeks.

The search engine 150 then generates and transmits a search results page that includes these related queries for the user's query, as well as the search results for the user's query. The search results page may be displayed in the web browser 120 or other application executing on the client computing device 110. One or more of the related queries may then be selected by the user for submission as a search query to the search engine 150, so that search results relevant to the selected related query can be obtained.

In some implementations, the search results page also includes search results for one or more of the related queries. The search results for the user's query within the search results page can be displayed separate from the search results for the related queries. For example, the search results for the user's query may appear on the left side of the search results page, while the search results for one or more of the related queries may appear on the right side. Alternatively, these search results may be located in other positions of the search results page. The positions of the search results may also be user configurable.

These related queries may for example also or alternatively be displayed within a cascaded drop down menu of the search field of an application, such as the web browser 120, executing on the client computing device 110 as the user is typing a partial query into the search field. A partial query is a query formulated by a user prior to an indication by the user that the query is complete. A user may indicate completion of the query by entering a carriage return or equivalent character. As another example, the user may indicate completion of the query by selecting a search button in a user interface presented to the user during entry of the query. As yet another example, the user may indicate completion of the query by saying a command in a speech interface or pausing more than a predetermined period of time.

In such a case, during the query entry process, the web browser 120 or other application executing on the client computing device 110 also transmits partial queries being formulated by the user to a suggestion engine 170. The suggestion engine 170 includes memory for storage of data and software applications, a processor for accessing data and executing applications, and components that facilitate communication over the network 140.

In response to the partial query, the suggestion engine 170 provides a set of query suggestions to the related query engine 180. These query suggestions may for example be past queries submitted by prior users. These query suggestions represent search queries that the user may want to submit instead of the partial query actually being typed. The suggestion engine 170 may use conventional or other techniques to determine which query suggestions to include in the set for the partial query. For example, the suggestion engine 170 may use prefix based matching. The suggestion engine 170 may also use other techniques to determine the query suggestions to include in the set.

The related query engine 180 can then modify the set of query suggestions by adding one or more related queries for at least one query suggestion in the set. The related query engine 180 can then provide the modified set for display to the user of the client computing device 110.

The techniques for adding the related queries to the set of query suggestions can vary from implementation to implementation. For example, the related queries may be added to the beginning or end, before or after the query suggestions in the set. Alternatively, other techniques may be used to add the related queries to the set.

Figure 2:
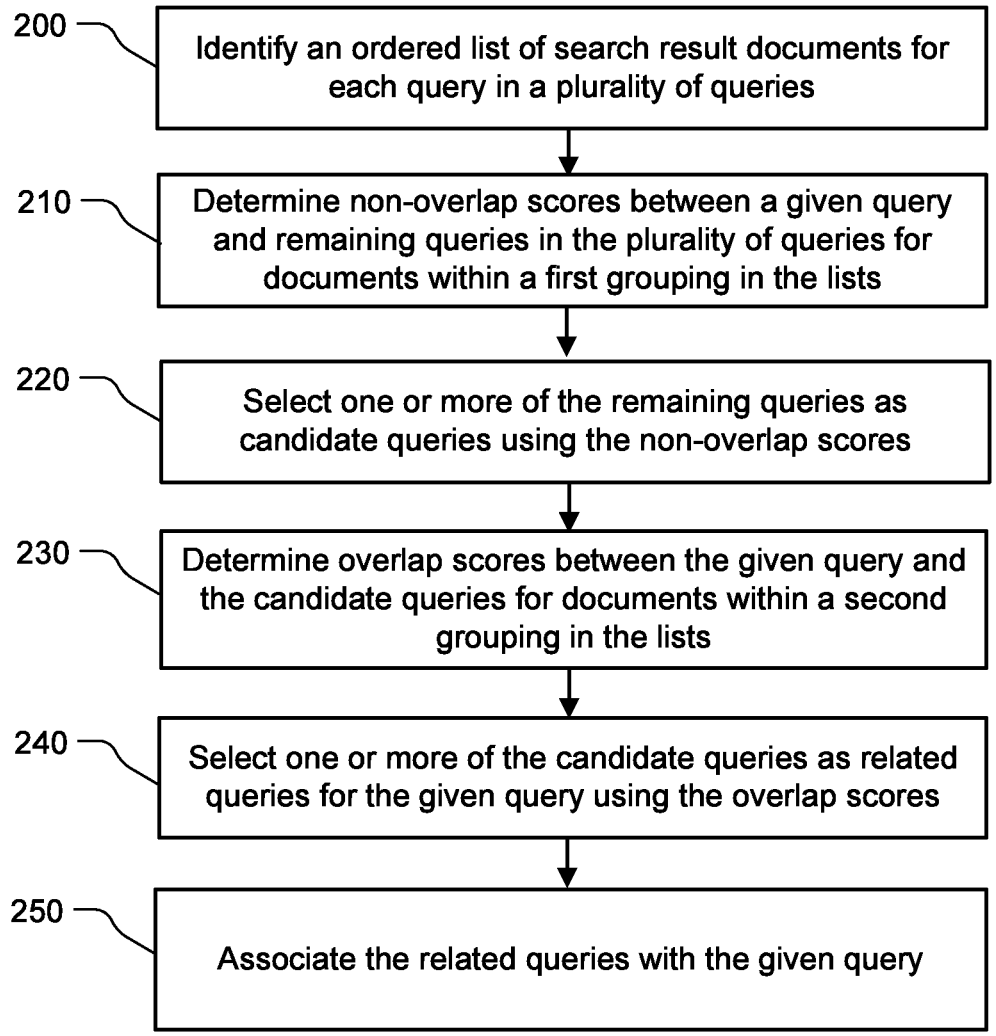
FIG. 2 illustrates a flow chart illustrating an example process for identifying related queries that represent different information requests.

FIG. 2 illustrates a flow chart illustrating an example process for identifying related queries that represent different information requests. Some implementations may perform the steps in different orders and/or perform different or additional steps than the ones illustrated in FIG. 2. For convenience, aspects of FIG. 2 will be described with reference to a system of one or more computers that performs the process. The system can be, for example, the related query engine 180 as described above with reference to FIG. 1. For convenience, FIG. 2 will be also be described with reference to a first grouping of search result documents that may be a continuous first grouping of search result documents in some implementations; and/or a second grouping of search result documents that may be a continuous second grouping of search result documents in some implementations. However, in some implementations, a first grouping of search result documents and/or a second grouping of search result documents may comprise search result documents from one or more non-continuous ranges.

For example, in some implementations, the first grouping may include the 2nd to the 10th highest ranked search result documents and the second grouping may include the 12th to the $14^{th}$ highest ranked search result documents. In some implementations, the first grouping may include the $2^{nd}$ to the $6^{th}$ highest ranked search result documents and the $9^{th}$ to the $15^{th}$ highest ranked search result documents, whereas the second grouping may include the $5^{th}$ to the $10^{th}$ highest ranked search result documents and the $16^{th}$ to the $20^{th}$ highest ranked search result documents.

At step 200, the system identifies an ordered list of search result documents for each query in a plurality of queries. In some implementations, the system retrieves these queries from the records 135. Alternatively, these queries can be obtained using other techniques.

At step 210, the system calculates or determines non-overlap scores between a given query and remaining queries by comparing the search result documents within a first, relatively high range in their corresponding ordered lists. As described in more detail below, this range is "relatively high"

because it includes search result documents that are more highly ranked in the ordered lists than those within a second range that are used in step 240 below.

The non-overlap score for a remaining query is based at least in part on how infrequently search result documents within the first range in the ordered list for the remaining query appear within the same range in the ordered list for the given query. The non-overlap score is thus a measure of the differences between the search results within this first range for the remaining query and the given query.

The upper and lower ranked positions that define this first range can vary from implementation to implementation. In some implementations, the first range may be a predetermined number of the highest ranked search result documents in the ordered lists, such as the 5 or 10 highest ranked search result documents. In some implementations, the first range may omit one or more of the highest ranked search result documents, such as being the 2nd to 10th highest ranked search result documents. The omission of one or more of the highest ranked search result documents may also be query dependent. For example, the highest ranked search result document for a particular query may be omitted if it is frequently selected by users upon being presented within search results for the particular query.

This predetermined number of highest ranked search result documents may for example be less than or equal to the number of search results documents that appear on the first search results page received from the search engine 150 in response to the corresponding query. In such a case, queries that have little or no overlap among the search result documents appearing on their corresponding first search results page are more likely to be identified as being related. Since it has been observed that many users only review the search results on the first search results page before submitting another query, the subsequent submission of a related query by a user is less likely to prominently display search results that contain the same information that has already been passed over by the user.

The non-overlap scores measure the dissimilarities between the search result documents within the first grouping in the ordered list for the given query appear and the first grouping in the ordered list for each of the remaining queries in the plurality of queries. As described herein, the non-overlap scores may be determined based on a comparison of the search result documents within the first grouping in the ordered list for the given query and the search result documents within a first grouping in the ordered lists for each of the remaining queries in the plurality of queries. In some implementations, the non-overlap scores may be independently determined based on similarity scores between the search result documents within the first grouping in the ordered list for the given query and the search result documents within the first grouping in the ordered lists for each of the remaining queries in the plurality of queries. In yet other implementations, the non-overlap scores may be determined based on both the comparison of the search result documents within the respective first groupings and on similarity scores between the search result documents within the respective first grouping.

The non-overlap scores may be based on a comparison of the search result documents within the first grouping in the ordered list for the given query and the search result documents within a first grouping in the ordered lists for each of the remaining queries in the plurality of queries. For example, the non-overlap score may be calculated as a function of the number of search result documents within the first range in the ordered list for the remaining query that do not appear within the same range in the ordered list for the given query. This function may be for example proportional to the number of search result documents that do not appear within the first range of both the remaining query and the given query.

In some implementations, for example, the non-overlap score may be based on whether the number of search result documents that appear within the first range of both the remaining query and the given query exceeds a threshold number of documents. In such a case, the non-overlap score may be assigned the lowest value if the number of overlapping documents exceeds the threshold number of documents.

In some implementations, the non-overlap scores may be independently determined based on similarity scores between the search result documents within the first grouping in the ordered list for the given query and the search result documents within the first grouping in the ordered lists for each of the remaining queries in the plurality of queries. For example, the similarity score between the given query and the remaining query can be based on the similarity between the content in the search result documents that appear within the first range in the ordered list for the given query, and content in the search result documents that appear within the first range in the ordered list for the remaining query. The techniques for calculating the similarity scores can vary from implementation to implementation.

In some implementations, for example, individual similarity scores are calculated between each term in the search result documents that appear within the first range in the ordered list for the given query, and each term in the search results documents that appear within the first range in the ordered list for the remaining query. The similarity score between two terms may for example be calculated based on their co-occurrence over a collection of documents, such as html web pages. The final similarity score between the given query and the remaining query may then be calculated as a function of the individual similarity scores. This function may be for example based on a sum of the individual similarity In yet other implementations, the non-overlap scores may be determined based on both the comparison of the search result documents within the respective first groupings and on similarity scores between the search result documents within the respective first grouping. For example, the non-overlap score may be calculated using the following equation:

$$NS(Q_A, Q_B) = \frac{\text{Non-Occurrence }(SR_A, SR_B)}{SS(SR_A, SR_B)}$$

where $NS(Q_A, Q_B)$ is the non-overlap score between given query $Q_A$ and remaining query $Q_B$, Non-Occurrence $(SR_A, SR_B)$ is the number of search result documents within the first range in the ordered list $SR_A$ for the given query $Q_A$ that do not appear within the first range in the ordered list $SR_B$ for the remaining query, and $SS(SR_A, SR_B)$ is the similarity score between the content in the search result documents within the first range in the ordered list $SR_A$ for the given query $Q_A$ and content in the search result documents within the first range in the ordered list $SR_B$ for the remaining query $Q_B$.

At step 220, the system uses the non-overlap scores to select one or more of the remaining queries as candidate queries for the given query. These candidate queries represent queries that potentially are related to the given query, but that do not return the same information as the given query. The techniques for selecting the candidate queries can vary from implementation to implementation. For example, a predetermined number of the remaining queries having the highest non-overlap scores may be selected. As another example, the non-overlap scores may be compared to a threshold, and the remaining queries that have non-overlap scores that satisfy the threshold may be selected as candidate queries.

At step 230, the system calculates overlap scores between the given query and the candidate queries by comparing the search result documents within a second, relatively low range in their corresponding ordered lists. The overlap score for a candidate query is based at least in part on how frequently search result documents within the second range in the ordered list for candidate query appear within the second range in the ordered list for the given query. This second range is "relatively low" because it includes at least some search result documents that are lower ranked in the ordered lists than those within the first range used to calculate the non-overlap scores as described above. The overlap score is thus a measure of the similarity between the relatively low search results for the candidate query and the given query.

The upper and lower ranked positions that define the second range can vary from implementation to implementation. In some implementations, the second range includes at least some of the search result documents within the first range. That is, the upper ranked position of the second range is greater than the lower ranked position of the first range. For example, the first range may include the 10 highest ranked search result documents in the ordered lists, while the second range may include the $5^{th}$ to $100^{th}$ highest ranked search result documents.

In some implementations, the second range may not overlap with the first range. In such a case, each of the documents within the first range is higher ranked in the respective ordered lists than each of the documents within the second range. For example, the first range may include the 5 highest ranked search results documents in the lists, while the second range may include the $20^{th}$ to $200^{th}$ highest ranked search results documents.

In some implementations, none of the search results corresponding to search documents within the second range in the lists appear on the first search results web page received from the search engine 150 in response to the corresponding queries.

The overlap scores measure the similarities between the search result documents within the second grouping in the ordered list for the given query and the second grouping in the ordered list for each of the candidate queries. As described herein, the overlap scores may be determined based on a comparison of the search result documents within the second grouping in the ordered list for the given query and the search result documents within a second grouping in the ordered lists for each of the remaining queries in the plurality of queries. In some implementations, the overlap scores may be independently determined based on similarity scores between the search result documents within the second grouping in the ordered list for the given query and the search result documents within the second grouping in the ordered lists for each of the candidate queries.

The overlap scores may be determined based on a comparison of the search result documents within the second grouping in the ordered list for the given query and the search result documents within a second grouping in the ordered lists for each of the candidate queries. For example, the overlap score can be calculated as a function of the number of search result documents within the second range in the ordered list for the remaining query that appear within the same range in the ordered list for the given query. This function may be for example proportional to the number of search result documents that do appear within the second range of both the remaining query and the given query.

In some implementations, the overlap scores may be independently determined based on determining similarity scores between the search result documents within the second grouping in the ordered list for the given query and the search result documents within the second grouping in the ordered lists for each of the candidate queries. For example, the similarity score between the given query and the remaining query can be based on the similarity between the content in the search result documents that appear within the second range in the ordered list for the given query, and content in the search result documents that appear within the second range in the ordered list for the candidate query. The techniques for calculating the similarity scores can vary from implementation to implementation.

For example, in some implementations, individual similarity scores are calculated between each term in the search result documents that appear within the second range in the ordered list for the given query, and each term in the search results documents that appear within the second range in the ordered list for the candidate query. The similarity score between two terms may for example be calculated based on their co-occurrence over a collection of documents, such as html web pages. The final similarity score between the given query and the candidate query may then be calculated as a function of the individual similarity scores. This function may be for example based on a sum of the individual similarity scores.

At step 240, the system then selects one or more of the candidate queries as related queries for the given query using the overlap scores. The techniques for selecting the related queries can vary from implementation to implementation. For example, a predetermined number of the candidate queries having the highest overlap scores may be selected. As another example, the overlap scores may be compared to a threshold, and the candidate queries having overlap scores that satisfy the threshold may be selected as related queries.

At step 250, the system stores data associating the related queries with the given query. This data can then be used in a subsequent computerized process to provide the queries that are related to the given query. This data may for example be stored in the form of a related query list, or any other type of data structure maintained by the system.

The steps 210, 220, 230, 240 and 250 can then be repeated for another query in the plurality of queries.

In some implementations, the system may also compute additional signals that are used to determine which of the candidate queries to select as related queries for the given query. For example, the system may calculate popularity scores for the candidate queries. A popularity score for a candidate query can be calculated based on a frequency of submission of the candidate query as a search query by prior users. In some implementations, the popularity score is calculated by counting the number of times the candidate query appears as a past search query in the records 135. The popularity score may also be weighted based on the elapsed times since the past search queries were submitted by the prior users. In such a case, the popularity scores can adapt to changes in users' searching behavior with time.

Other signals that the system may calculate include content freshness scores. A content freshness score may be based on elapsed times since content within the search result documents within the second range in the ordered list for a candidate query has been updated or otherwise changed.

The system may then use the popularity scores and/or other computed signals to determine which of the candidate queries to select as related queries for the given query. For example, the system may calculate a final score for a candidate query that is a function of its overlap score and its popularity score. These final scores can then be used to select the candidate queries. This function may be for example proportional to the overlap score and the popularity score. For example, the final score for a candidate query may be calculated as a weighted average of its overlap score and its popularity score. In implementations in which the system computes other signals, such as the content freshness scores mentioned above, the final score may be based on a weighted average of each of these computed signals.

In response to a request for queries related to the given query, the system can then provide the related queries as query suggestions for the given query. These related queries represent information requests that may be relevant to the information need of the user who submitted the given query, while also being different from the most relevant information already being searched by the user. One or more of the related queries may then be selected by the user for submission as a search query to a search engine, so that search results can be obtained.

Figure 3A:
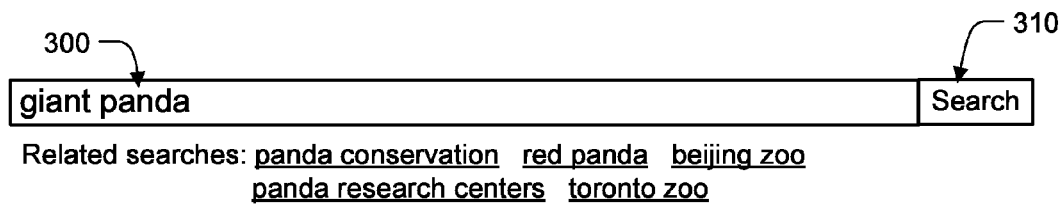
FIGS. 3A-3B are screenshots illustrating example environments that can be used to provide related queries to a user.
Figure 3B:
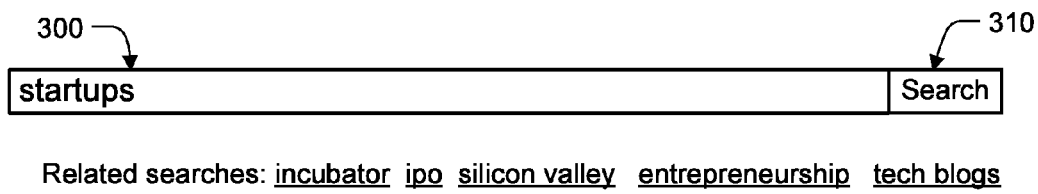

FIGS. 3A-3B are screenshots illustrating example environments that can be used to provide related queries to a user. In FIG. 3A, the screenshot includes a search field 300 and a search button 310. In this example, when the user submits the search query "giant panda", the related queries are embedded within the search results web page as "related searches." In this example, the related queries include "panda conservation", "red panda", "beijing zoo", "panda research centers" and "toronto zoo".

In the example in FIG. 3B, when the user submits the search query "startups", the related queries include "incubator", "ipo", "silicon valley", "entrpreneurship" and "tech blogs".

Figure 4:
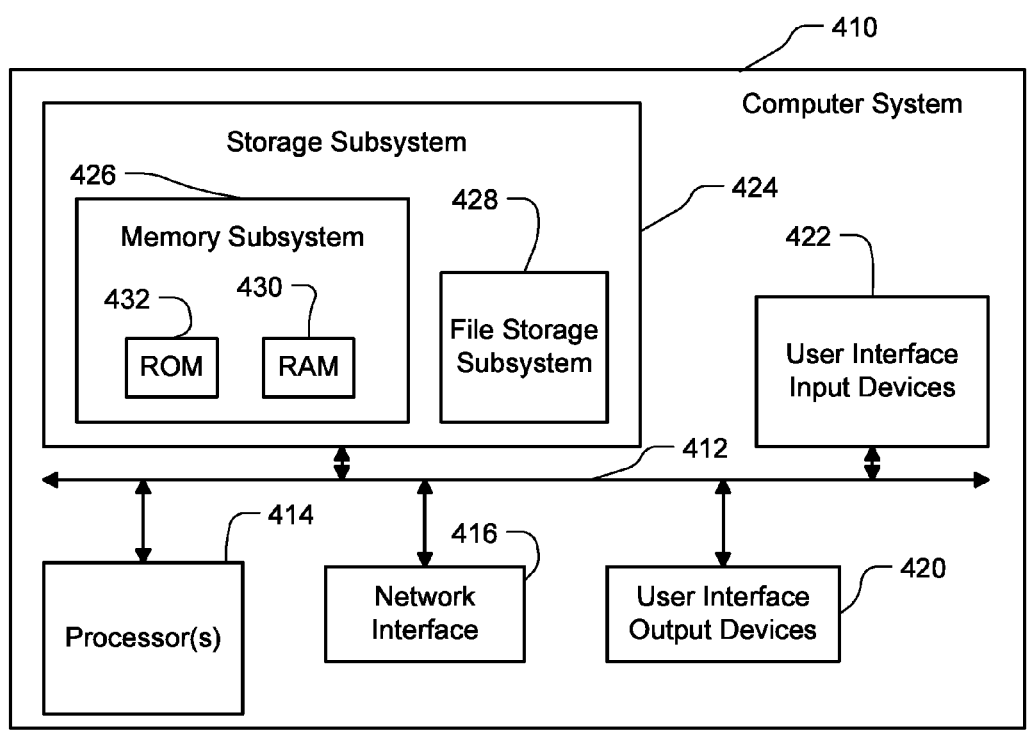
FIG. 4 is a block diagram of an example computer system.

FIG. 4 is a block diagram of an example computer system. Computer system 410 typically includes at least one processor 414 that communicates with a number of peripheral devices via bus subsystem 412. These peripheral devices may include a storage subsystem 424, comprising for example memory devices and a file storage subsystem, user interface input devices 422, user interface output devices 420, and a network interface subsystem 416. The input and output devices allow user interaction with computer system 410. Network interface subsystem 416 provides an interface to outside networks, including an interface to communication network 140, and is coupled via communication network 140 to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 410 or onto communication network 140.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein, including the logic to identify related queries that represent different information requests according to the processes described herein. These software modules are generally executed by processor 414 alone or in combination with other processors.

Memory 426 used in the storage subsystem can include a number of memories including a main random access memory (RAM) 430 for storage of instructions and data during program execution and a read only memory (ROM) 432 in which fixed instructions are stored. A file storage subsystem 428 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 428 in the storage subsystem 424, or in other machines accessible by the processor.

Bus subsystem 412 provides a mechanism for letting the various components and subsystems of computer system 410 communicate with each other as intended. Although bus subsystem 412 is shown schematically as a single bus, alternative embodiments of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating the preferred embodiments. Many other configurations of computer system 410 are possible having more or fewer components than the computer system depicted in FIG. 4.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for identifying related queries which represent different information requests, systems including logic and resources to identify related queries which represent different information requests, systems that take advantage of computer-assisted methods for identifying related queries which represent different information requests, media impressed with logic to identify related queries which represent different information requests, data streams impressed with logic to identify related queries which represent different information requests, or computer-accessible services that carry out computer-assisted methods for identifying related queries which represent different information requests. It is contemplated that modifications and combinations will readily occur to those skilled in the art, which modifications and combinations will be within the scope of the following claims.

We claim as follows:
1. A method comprising:
   identifying a respective ordered list of search result documents for each query in a plurality of queries;
   identifying:
   a given query in the plurality of queries;
   a first and second grouping in the ordered list for the given query; and a first and second grouping in the ordered list for each of the remaining queries in the plurality of queries;

determining non-overlap scores between the given query and each of the remaining queries in the plurality of queries, wherein the non-overlap scores measure dissimilarities between the search result documents within the first grouping in the ordered list for the given query and the first grouping in the ordered list for each of the remaining queries in the plurality of queries;

selecting one or more candidate queries from the remaining queries in the plurality of queries based on the non-overlap scores;

determining overlap scores between the given query and each of the candidate queries, wherein the overlap scores measure similarities between the search result documents within the second grouping in the ordered list for the given query and the second grouping in the ordered list for each of the candidate queries;

selecting one or more related queries from the candidate queries based on the overlap scores; and storing data associating the related queries with the given query.

2. The method in claim 1, wherein:
the non-overlap scores are determined based on a comparison of the search result documents within the first grouping in the ordered list for the given query and the search result documents within the first grouping in the ordered list for each of the remaining queries in the plurality of queries.

3. The method in claim 1, wherein:
the non-overlap scores are determined based on similarity scores between the search result documents within the first grouping in the ordered list for the given query and the search result documents within the first grouping in the ordered list for each of the remaining queries in the plurality of queries.

4. The method of claim 1, wherein:
the non-overlap scores are determined based on both the comparison of the search result documents within the respective first groupings and on similarity scores between the search result documents within the respective first groupings.

5. The method of claim 1, wherein:
the overlap scores are determined based on a comparison of the search result documents within the second grouping in the ordered list for the given query and the search result documents within the second grouping in the ordered list for each of the candidate queries.

6. The method of claim 1, wherein:
the overlap scores are determined based on similarity scores between the search result documents within the second grouping in the ordered list for the given query and the search result documents within the second grouping in the ordered list for each of the candidate queries.

7. The method of claim 1, wherein:
the search results documents in the first grouping in the ordered list for the given query have the same ordering as the respective search result documents in the first grouping in the ordered list for each of the remaining queries in the plurality of queries.

8. The method in claim 1, wherein:
the search results documents in the second grouping in the ordered list for the given query have the same ordering as the respective search result documents in the second grouping in the ordered list for each of the candidate queries.

9. The method of claim 1, wherein:
at least one search result document within the respective first groupings in the respective ordered lists has a higher numerical order than at least one search result document within the respective second groupings in the respective ordered lists.

10. The method of claim 1, wherein:
each search result document within the respective first groupings in the respective ordered lists has a higher numerical order than each search result document within the respective second groupings in the respective ordered lists.

11. The method of claim 1, wherein:
the ordered lists of search result documents are obtained from a search engine and the search results corresponding to each of the search result documents within the first grouping in the respective ordered lists appear on a first search results page received from the search engine in response to the corresponding queries.

12. The method of claim 11, wherein:
none of the search results corresponding to the search result documents within the second grouping in the respective ordered lists appear on the first search results page received from the search engine in response to the corresponding queries.

13. The method of claim 1, wherein:
the first grouping comprises a predetermined number of highest ranked search result documents in the respective ordered lists.

14. The method of claim 1, wherein:
the queries in the plurality of queries are past queries submitted by prior users; and
selecting one or more of the candidate queries is further based on a frequency that the respective candidate queries were submitted by the prior users.

15. The method of claim 14, wherein:
selecting one or more of the candidate queries is further based on elapsed times since the respective candidate queries were submitted by the prior users.

16. The method of claim 1, further comprising:
receiving the given query; and
transmitting one or more of the related queries as query suggestions for the received given query.

17. The method of claim 16, wherein:
transmitting the selected one or more related queries comprises transmitting a search results page, the search results page including the one or more related queries and identifying search result documents in the ordered list for the given query.

18. A system including memory and one or more processors operable to execute instructions, stored in the memory, comprising instructions to perform the operations of:
identifying a respective ordered list of search result documents for each query in a plurality of queries;
identifying:
 a given query in the plurality of queries;
 a first and second grouping in the ordered list for the given query; and
 a first and second grouping in the ordered list for each of the remaining queries in the plurality of queries;
determining non-overlap scores between the given query and each of the remaining queries in the plurality of queries, wherein the non-overlap scores measure dissimilarities between the search result documents within the first grouping in the ordered list for the given query and the first grouping in the ordered list for each of the remaining queries in the plurality of queries;

selecting one or more candidate queries from the remaining queries in the plurality of queries based on the non-overlap scores;

determining overlap scores between the given query and each of the candidate queries, wherein the overlap scores measure similarities between the search result documents within the second grouping in the ordered list for the given query and the second grouping in the ordered list for each of the candidate queries;

selecting one or more related queries from the candidate queries based on the overlap scores; and storing data associating the related queries with the given query.

19. The system of claim 18, wherein:
the non-overlap scores are determined based on a comparison of the search result documents within the first grouping in the ordered list for the given query and the search result documents within the first grouping in the ordered list for each of the remaining queries in the plurality of queries.

20. The system of claim 18, wherein:
the non-overlap scores are determined based on similarity scores between the search result documents within the first grouping in the ordered list for the given query and the search result documents within the first grouping in the ordered list for each of the remaining queries in the plurality of queries.

21. The system of claim 18, wherein:
the non-overlap scores are determined based on both the comparison of the search result documents within the respective first groupings and on similarity scores between the search result documents within the respective first groupings.

22. The system of claim 18, wherein:
the overlap scores are determined based on a comparison of the search result documents within the second grouping in the ordered list for the given query and the search result documents within the second grouping in the ordered list for each of the candidate queries.

23. The system of claim 18, wherein:
the overlap scores are determined based on similarity scores between the search result documents within the second grouping in the ordered list for the given query and the search result documents within the second grouping in the ordered list for each of the candidate queries.

24. The system of claim 18, wherein:
the search results documents in the first grouping in the ordered list for the given query have the same ordering as the respective search result documents in the first grouping in the ordered list for each of the remaining queries in the plurality of queries.

25. The system of claim 18, wherein:
the search results documents in the second grouping in the ordered list for the given query have the same ordering as the respective search result documents in the second grouping in the ordered list for each of the candidate queries.

26. The system of claim 18, wherein:
at least one search result document within the respective first groupings in the respective ordered lists has a higher numerical order than at least one search result document within the respective second groupings in the respective ordered lists.

27. The system of claim 18, wherein:
each search result document within the respective first groupings in the respective ordered lists has a higher numerical order than each search result document within the respective second groupings in the respective ordered lists.

28. The system of claim 18, wherein:
the ordered lists of search result documents are obtained from a search engine and the search results corresponding to each of the search result documents within the first grouping in the respective ordered lists appear on a first search results page received from the search engine in response to the corresponding queries.

29. The system of claim 28, wherein:
none of the search results corresponding to the search result documents within the second grouping in the respective ordered lists appear on the first search results page received from the search engine in response to the corresponding queries.

30. The system of claim 18, wherein:
the first grouping comprises of a predetermined number of highest ranked search result documents in the respective ordered lists.

31. The system of claim 18, wherein:
the queries in the plurality of queries are past queries submitted by prior users; and
selecting one or more of the candidate queries is further based on a frequency that the respective candidate queries were submitted by the prior users.

32. The system of claim 31, wherein:
selecting one or more of the candidate queries is further based on elapsed times since the respective candidate queries were submitted by the prior users.

33. The system of claim 18, further comprising instructions to perform the operations of:
receiving the given query; and
transmitting one or more of the related queries as query suggestions for the received given query.

34. The system of claim 33, wherein:
the instructions to perform the operations of transmitting the selected one or more related queries further comprises instructions to perform the operations of transmitting a search results page, the search results page including the one or more related queries and identifying search result documents in the ordered list for the given query.

35. A non-transitory computer readable storage medium storing computer instructions executable by a processor to perform a method comprising:
identifying a respective ordered list of search result documents for each query in a plurality of queries;
identifying:
a given query in the plurality of queries;
a first and second grouping in the ordered list for the given query; and
a first and second grouping in the ordered list for each of the remaining queries in the plurality of queries;
determining non-overlap scores between the given query and each of the remaining queries in the plurality of queries, wherein the non-overlap scores measure the dissimilarities between the search result documents within the first grouping in the ordered list for the given query and the first grouping in the ordered list for each of the remaining queries in the plurality of queries;
selecting one or more candidate queries from the remaining queries in the plurality of queries based on the non-overlap scores;
determining overlap scores between the given query and each of the candidate queries, wherein the overlap scores measure the similarities between the search result documents within the second grouping in the ordered list for the given query and the second grouping in the ordered list for each of the candidate queries;

selecting one or more related queries from the candidate queries based on the overlap scores; and storing data associating the related queries with the given query.

\* \* \* \* \*